US006647408B1

(12) United States Patent
Ricart et al.

(10) Patent No.: US 6,647,408 B1
(45) Date of Patent: Nov. 11, 2003

(54) TASK DISTRIBUTION

(75) Inventors: Glenn Ricart, Salt Lake City, UT (US); Del Jensen, Orem, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/354,429

(22) Filed: Jul. 16, 1999

(51) Int. Cl.$^7$ ................................................. G06F 9/00
(52) U.S. Cl. ....................... 709/105; 711/147; 711/203; 711/220; 712/13; 712/21; 712/22; 717/151
(58) Field of Search .............................. 700/1; 709/105; 711/203, 220, 147; 712/13, 21, 22; 717/151

(56) References Cited

U.S. PATENT DOCUMENTS

| | | | | |
|---|---|---|---|---|
| 4,459,664 A | * | 7/1984 | Pottier et al. ............... | 709/105 |
| 4,590,555 A | | 5/1986 | Bourrez ....................... | 364/200 |
| 5,103,393 A | | 4/1992 | Harris et al. ................ | 395/650 |
| 5,146,540 A | | 9/1992 | Natarajan .................... | 395/11 |
| 5,197,140 A | * | 3/1993 | Balmer ........................ | 711/220 |
| 5,680,634 A | * | 10/1997 | Estes ........................... | 712/15 |

OTHER PUBLICATIONS

Hilbert Space, pp. 1–2; 1997.
Munkres, *Topology: A First Course*, pp. 98, 126, 279; 1975.
Anderson et al., "Performance Implications of Thread Management . . . ", 1989.
Thekkath et al., "Impact of Sharing–Based Thread Placement . . . ", 1994.
Tanenbaum, *Distributed Operating Systems*, pp. 169–213, 234–241; 1995.
Silberschatz, *Operating System Concepts*, pp. 659–689; 1994.
Deo et al., "Processor Allocation in Parallel Battlefield Simulation", 1992.
Liu et al., "Non–contiguous Processor Allocation . . . ", 1994.
McCann et al., "Processor Allocation Policies . . . ", 1994.
Ray Tracing News, pp. 1–5; 1989.
Ricart, "Efficient Synchronization Algorithms . . . ", 1980.

\* cited by examiner

*Primary Examiner*—Zarni Maung
*Assistant Examiner*—Dustin Nguyen
(74) *Attorney, Agent, or Firm*—Haynes and Boone, LLP

(57) ABSTRACT

Methods, signals, devices, and systems are provided for matching tasks with processing units. A region within a multi-faceted task space is allocated to a processing unit. A point in the multi-faceted task space is assigned to a task. The task is then associated with the processing unit if the region allocated to the processing unit is close to the point assigned to the task. The region allocated to a processing unit may be changed. If no assigned point for a task is sufficiently close to any allocated processing unit region, the task is suspended. Overlapping regions may be assigned to different processing units. In some implementations, the union of the allocated regions covers the task space, while in others it does not. Regions may also be allocated to wait conditions and one or more dimensions of a region may be allocated to conventional processor allocators.

8 Claims, 4 Drawing Sheets

TASK DISTRIBUTION

FIELD OF THE INVENTION

The present invention relates to processor allocation generally, that is, to the problem of associating tasks with processing units in a computing system. The invention relates more particularly to associations made using derived task spaces and multidimensional task spaces.

TECHNICAL BACKGROUND OF THE INVENTION

Networks and other collections of connected processing units can be much more reliable than a single processing unit for a variety of reasons. When a processing unit fails, its tasks can be reassigned to working units, and new tasks can be diverted away from the failed unit. Tasks can often be performed faster by adding processing units and dividing tasks between processing units, which can then execute the tasks at least partially in parallel. Processing units include individual computer CPUs and supporting circuitry and software necessary for executing a task, as well as larger groups of processors such as multiprocessors and clusters.

One traditional method of associating tasks with processing units includes assigning a name or an ordinal number (sometimes referred to as a whole number or integer) to each task. A similar name or ordinal number is assigned to each processing unit. Names may be strings, enumeration values, or other familiar identifiers. Each task is then placed on a list associated with the assigned processing unit by placing its name, number, or other identifier on the list. Each processing unit thus has a list of the tasks it needs to perform. When a processing unit is added to the computing system, tasks must be explicitly sent to the new server. If existing tasks are among those sent, their identifiers must be located in the existing server list, deleted, and then reassigned to a new server. When a processing unit fails, tasks in the failed server's list must be located, deleted and then reassigned to a new server.

One variation assigns a fractional number (sometimes referred to as a real number) to each task and a range of fractional values to each processing unit. For instance, each task could be assigned a fraction in the interval [0, 1] on the real number line using the familiar Euclidean metric, with each processing unit being assigned a subinterval within that range. A given task is then associated with a given processing unit if the interval allocated to the processing unit contains the fraction assigned to the task.

With either approach, load balancing may be used to spread tasks evenly among servers or other processing units. Load balancing algorithms determine where to assign each task so that the collection of tasks and processing units satisfies some criterion such as finishing as quickly as possible. To achieve high reliability of the network as a whole, tasks assigned to failed servers are rebalanced across operating servers. This may require redistributing the list associated with a failed processing unit among the currently working processing units. Making, maintaining, and redistributing the lists is a relatively expensive operation. Distributed networks must often execute complicated distributed algorithms using imperfect knowledge to approximate optimal bandwidth, and task lists must often be kept in multiple places to facilitate recovery from failures.

A drawback of the approach that assigns fractions in [0 . . . 1] to tasks is that assigning the fractions may require difficult or arbitrary choices, because only a single fraction value is assigned to a given task. All servers that might be eligible to receive the task must likewise be characterized in the same way, namely, according to the single criterion that was used when characterizing the task by assigning it a fraction value.

Thus, it would be an advancement in the art to provide improved ways to associate tasks with server computers and other processing units so that creating and maintaining conventional task lists is unnecessary.

It would also be an advancement to provide improved ways to associate tasks with processing units such that the tasks and the processors may be characterized according to several criteria.

It would be an additional advancement to provide such improvements which extend the capabilities of existing processor allocation mechanisms, and hence can be used in conjunction with existing mechanisms.

Such improvements are disclosed and claimed herein.

BRIEF SUMMARY OF THE INVENTION

The present invention provides improved tools and techniques for associating tasks with server computers and other processing units. In one embodiment, a computer-implemented method begins by allocating a region within a derived metric space such as a Hausdorff task space with a Hausdorff or other metric, and then assigning a non-empty subset of the task space to each task. Each task is then assigned to the processing unit whose region is closest—in the given metric—to the task's assigned subset. In another embodiment, a computer-implemented method begins by allocating a region within a multidimensional task space which is a complete space having an associated metric, and then assigning each task a point in the space. If the region allocated to the processing unit includes the point which has been assigned to the task, then the task is associated with the processing unit.

Thus, some embodiments avoid giving tasks an identity by assigning a name or a single ordinal number or a single real value. Instead, each task is assigned multiple values for identification, at least for purposes of matching tasks with processing units. Likewise, some embodiments avoid giving processing units an identity by assigning a name or a single ordinal number or a single real value. Instead, each processing unit is assigned a multi-valued and/or multidimensional region. A task or a processing unit may, of course, have other identifiers used for other purposes; the focus here is on identifiers used for processor allocation.

Multidimensional and/or derived task spaces are termed "multi-faceted". A "point" in a multi-faceted task space may thus be multidimensional in some embodiments and one-dimensional in others. A "subset" assigned to a task may be limited to a single point in some embodiments and be allowed to contain multiple points in other embodiments. The "component" value(s) within a point represent the position of the point within the dimension(s) of the task space. Point components may be real or fractional values, and points may include a mixture of such real values with enumerated or ordinal values.

Stated differently, some embodiments each use a derived space as the multi-faceted task space, such as the Hausdorff space (with a Hausdorff or other metric) derived from a foundation space. These derived spaces may be one-dimensional or multidimensional. They include the Hausdorff space derived from the real interval [0 . . . 1], the Hausdorff space derived from the two-dimensional foundation space [0. . . 1]×[0 . . . 1], and Hausdorff spaces derived from crossing the real line R and/or real intervals from R to obtain a space of N-dimensional points, and spaces derived from other foundation spaces. The terms "derived space" and "Hausdorff space" are used as synonyms herein (note, however, that a derived space need not use a Hausdorff metric). In these spaces, each task may be assigned one or more points of the foundation space, since a point in the derived space is a non-empty subset of the foundation space points. Each processing unit is allocated a region which is a not-necessarily-connected subset of the foundation space points.

Other embodiments do not necessarily use derived (Hausdorff) spaces, but use a multidimensional space as the multi-faceted task space. For instance, such embodiments include the two-dimensional space derived from [0 . . . 1]×[0 . . . 1] with the familiar Euclidean metric, and higher dimensional Hausdorff spaces derived from crossing the real line R and/or real intervals from R to obtain a space of N-dimensional points. In these spaces, each task may be one (multidimensional) point of the foundation space. Each processing unit is again allocated a region which is a subset of the foundation space points.

As noted, in some embodiments more than one point may be associated with a given task. The point set which identifies a task can be chosen at random. However, it may also represent nominal values in an environment chosen to make the task execute more efficiently.

Processing units are allocated a subset of the task space. A given task is routed to a server or other processing unit whose region is closest to the points) assigned to the tasks. Tasks may be similarly associated with a wait condition or a suspended state, when one or more of their assigned points fall within and/or close to regions allocated to such conditions or states.

In short, the present invention provides improved tools and techniques for associating tasks with processing units. The mathematics used by the invention for the specific job of associating tasks with processing units is more general than the math used in conventional systems, but the invention can assist processor allocation, load balancing, and related administrative jobs. The invention also allows tasks and processors to be characterized by multiple criteria, because multiple dimensions and/or derived spaces can be used to define task points and processor regions. This allows tradeoffs that were not possible in conventional one-dimensional systems. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
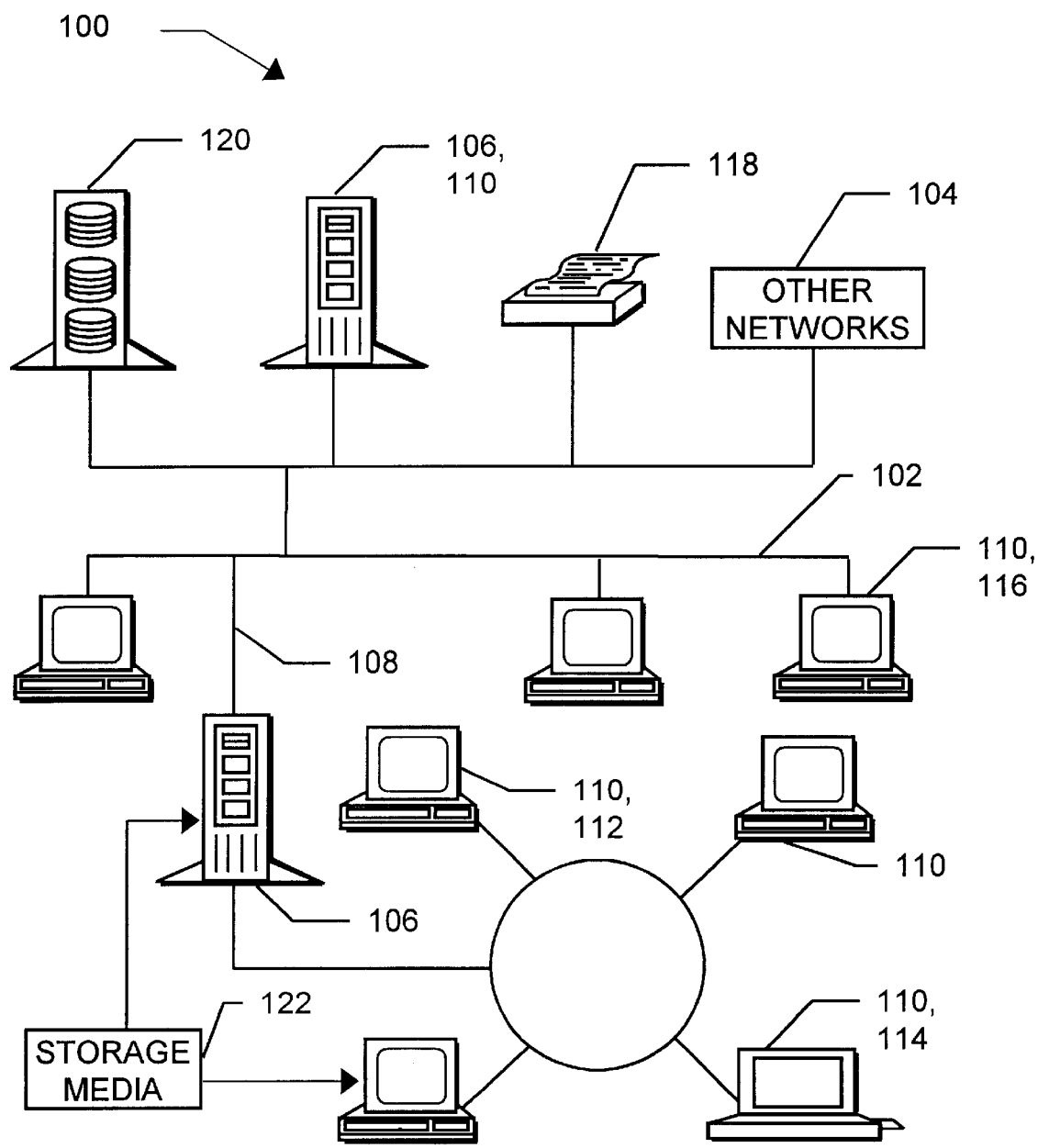
FIG. 1 is a diagram illustrating one of the many distributed computing systems suitable for use according to the present invention.

The present invention relates to methods, systems, signals, and devices for associating tasks with processing units in a computer network or other computer system. Various components of the invention are discussed in turn below.

Mathematical Background

The present invention utilizes mathematical concepts from areas of mathematics such as real analysis, set theory, and topology. These mathematical concepts may be less familiar to some practitioners than those required under some conventional approaches, but they are not new concepts, at least not in and of themselves. No claim is made to these concepts per se. However, the specific uses made of these mathematical concepts in the limited context of the present invention are novel and claimed. For convenient reference, a summary is provided below of some of the relevant mathematical concepts. Understanding these general concepts will help one understand the structure and operation of specific embodiments of the invention.

A "space" or "topological space" is a set S of points together with a specification of the open subsets of S. For instance, the real number line R is a space which includes an infinite number of points, with each point being named by a one-to-one correspondence between the points and the real numbers. The line provides a linear ordering, which in turn motivates the standard Euclidean metric for the real numbers. The open sets of R can be derived from the metric by stipulating the sets $\{y: |y-x|<e\}$ for every $(x, e)$ where $x$ and $e$ are real numbers.

R is an example of a "foundation space" from which other spaces can be derived. Other foundation spaces include the space I of integers and various spaces E containing a finite set of enumerated values. In a one-dimensional foundation space, each point corresponds to exactly one value. In a multi-dimensional foundation space, each component of a point corresponds to exactly one value and each point has exactly one component per dimension.

By contrast, each point of a "derived space" is a subset of the points of the underlying foundation space. For instance, if we take R as the foundation space, and H as the derived space, then each of the following is a single point in H: the subset of R consisting of all integers, the subset of R consisting of $\{3, 7.5, \ln(.3)\}$, and $\{55\}$. If necessary, closure of the space may be taken to provide formal mathematical rigor.

A "metric space" is a topological space which has an associated "metric" which is compatible with the topology. A metric is a distance function that assigns distances to pairs of points in the space. A space may have more than one associated metric, but any given metric function $d(x, y)$ must satisfy conditions known as positivity, symmetry, and the triangle inequality for all points x, y, z in the space. According to positivity, d(x, y) is greater than or equal to 0; d(x, x) =0; and d(x, y) is greater than 0 if x does not equal y. According to symmetry, d(x, y)=d(y, x). According to the triangle inequality, d(x, y) is less than or equal to d(x, z)+d(z, y).

A "spherical neighborhood" or "neighborhood" of a given point x is a set of points within some distance of the point x. A neighborhood is a generalization of the idea of a circle having a radius r and a center at the given point x. That is, the neighborhood of a point x is the set of all points y such that d(x, y)<r for some r>0.

In mathematics generally, a region is sometimes simply a subset of a space, and further conditions are not necessarily required. In terms of the present invention, however, a "region" allocated to a processing unit may be constrained in some embodiments to be at least a compact subset of a metric space. In addition, the set of points assigned to a task under the invention is compact. A "compact" subset is a subset which is both bounded and closed. A set is "bounded" if the entire set can be enclosed in a neighborhood of sufficiently large radius. A set is "closed" if the set contains all of its limit points. A point x is a "limit point" of a set S if every neighborhood of x contains at least one point of S, regardless of how small the neighborhoods of x become. An "interval" is a one-dimensional region or subregion.

A "Hausdorff metric" is a metric which can be used to find the distance between subsets of a metric space. Two sets are within a given Hausdorff distance r from each other if and only if any point of one set is within the distance r from some point of the other set. A Hausdorff space may use the Hausdorff metric, but need not do so.

A sequence of points in a metric space is called a "Cauchy sequence" if the elements of the sequence eventually become close to one another and stay close. That is, the distance between two points in a Cauchy sequence can be made as small as desired by choosing the points far enough out in the sequence. Each Cauchy sequence converges to a limit point. If every Cauchy sequence in a given metric space converges to a limit point that is also in the metric space, then the metric space is said to be "complete". If (X, d) is a complete metric space, then it can be shown that (H(x), d) is also a complete metric space, where (H(x), d) is defined by using a Hausdorff metric on the set of all compact nonempty subsets of (X, d). In terms of the invention, (H(x), d) provides a useful framework for task allocation and load-balancing, as described by the discussion herein of processing units, regions, tasks, and points.

A "Hilbert space" H is a complete metric space which is also a vector space with an inner product. A "vector" is defined by a first and second point, or by a point and a direction. The vectors in a Hilbert space H can be added, and they can be multiplied by scalars using familiar rules of vector arithmetic. The "inner product" or "dot product" maps a pair of vectors to a scalar. The inner product of any vector x with itself is a nonnegative real number whose square root is the length or "norm" $\|x\|$ of the vector x. Given two vectors x and y, the function $\|x-y\|$ is a metric for H. A "projection" of a vector x onto a vector y is a vector z such that (i) z is parallel to y, and (ii) z has a length equal to the dot product of x with u, where u is a unit vector in the same direction as y.

Mathematically, a region is "connected" if it cannot be represented as the union of two disjoint non-empty sets. Note that a region can be compact without necessarily being connected. In terms of the present invention generally, a "region" is not necessarily connected, but some embodiments may be limited to connected regions.

Computers and Networks Generally

Individual computers and/or computer networks may be configured according to the invention. Suitable computer networks include, by way of example, local networks, wide area networks, and/or the Internet. "Internet" as used herein includes variations such as a private Internet, a secure Internet, a value-added network, a virtual private network, or an intranet. The computers connected by the network or used in isolation according to the invention may be workstations, laptop computers, disconnectable mobile computers, servers, computing clusters, mainframes, or a combination thereof, the term "mainframes" includes, without limitation, hypercube, massively parallel, symmetric multiprocessing, and other architectures having multiple processing units. The computer hardware may be general-purpose, special purpose, stand-alone, and/or embedded. The network may include one or more LANs, wide-area networks, Internet servers and clients, intranet servers and clients, or a combination thereof.

One of the many computer systems suited for use with the present invention is indicated generally at 100 in FIG. 1. In various embodiments, the system 100 includes Novell Netware® network operating system software (NETWARE is a registered trademark of Novell, Inc.), NetWare Connect Services, VINES, Windows NT, Windows 95, Windows 98, Windows 2000, LAN Manager, or LANtastic network operating system software (VINES is a trademark of Banyan Systems; NT, WINDOWS 95, WINDOWS 98, WINDOWS 2000, and LAN MANAGER are trademarks of Microsoft Corporation; LANTASTIC is a trademark of Artisoft). The system 100 may include a local area network 102 which is connectable to other networks 104, including other LANs or portions of the Internet or an intranet, through a gateway or similar mechanism.

The system 100 includes several servers 106 that are connected by network signal lines 108 to one or more network clients 110. The servers 106 and network clients 110 may be configured by those of skill in the art in a wide variety of ways to operate according to the present invention. The servers 106 may be configured as Internet servers, as intranet servers, as directory service providers or name servers, as software component servers, as file servers, or as a combination thereof The servers 106 and clients 110 may be uniprocessor or multiprocessor machines. The servers 106 and clients 110 each include an addressable storage medium such as random access memory and/or a non-volatile storage medium such as a magnetic or optical disk.

Suitable network clients 110 and individual computers include, without limitation, personal computers 112, laptops 114, workstations 116, and (in the case of a network) dumb terminals. The signal lines 108 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media.

In addition to the network client computers 110, a printer 118 and an array of disks 120 are also attached to the particular system 100 shown; other embodiments may include these and/or other peripheral equipment. A given computer may function both as a client 110 and a server 106; this may occur, for instance, on computers running Microsoft Windows NT software. Although particular individual and network computer systems and components are shown, those of skill in the art will appreciate that the present invention also works with a variety of other networks and computers.

The servers 106 and the network clients 110 are capable of using floppy drives, tape drives, optical drives or other means to read a storage medium 122. A suitable storage medium 122 includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system to operate in a specific and predefined manner as described herein. Thus, the medium 122 tangibly embodies a program, functions, and/or instructions that are executable by the servers 106 and/or networked or individual computers such as the clients 110 to perform task association steps of the present invention substantially as described herein.

Tasks Generally

As used here, the term "task" includes one or more threads, processes, routines, interrupt or exception handlers, modules, packages, programs, jobs, or other collection of executable instructions. A given task may include its own data, or it may reference global or shared data. Executable instructions may be in the form of machine language, micro-code, assembly language instructions, portable byte codes, job control language, scripts, interpretable source code, object code, linked code, and/or combinations thereof

Task Spaces

A task space is at least a metric space and may be further limited, depending on the embodiment. Some embodiments use a derived N-dimensional space, such as the N-dimensional Hausdorff space (with a Hausdorff or other metric) derived from a foundation space, with N greater than or equal to one, depending on the embodiment. Other embodiments do not necessarily use derived (Hausdorff) spaces, but are N-dimensional with N strictly greater than one. In some embodiments, at least one dimension is along a "fraction space", which is a space defined by two numbers that are the endpoints of an interval containing the fractions in the fraction space. The metric(s) may be Euclidean, taxicab, Hausdorff, or other metrics, depending on the embodiment.

A space which is derived, or multidimensional, or both, is termed a "multi-faceted" space. Multi-faceted spaces can be built in various ways from simpler spaces by expanding the definition of "point" and/or expanding to multiple dimensions. Thus, the space R of real numbers with the standard Euclidean metric (or the topologically equivalent space of real numbers in an interval such as [0 . . . 1] with the Euclidean metric) is a metric space. But R (or a real interval in R) with the Euclidean metric is not a multi-faceted metric space, because it is neither derived nor multidimensional. It is not derived because it is a foundation space—points correspond with numbers in a one-to-one manner, rather than allowing points to include a set of one or more numbers as may occur in a derived space. It is not multidimensional because it is one-dimensional.

The invention involves determining when a point is close to a region in a multi-faceted task space. A point is "close" to a region if some predefined criterion is met; one or more different criteria may be used in a given embodiment. In some cases, a point is considered close to a region if the region contains the point. In other cases, a point is close to a region if the shortest distance from the point to the region is no greater than the shortest distance between the point and other defined regions, such as regions defined through allocation to other processing units and/or wait conditions. In other cases, a point is close to a region if the distance between the point and the region is less than a specified threshold value (any close region will do).

In some purely mathematical spaces, no matter how close two points appear to be, there is an infinitely large number of points between the two. Given two distinct points represented in a computer using a fractional representation, an arbitrarily large (but finite) number of additional points between the two points can also be represented, using additional bits in the numeric representations as necessary. Numeric points are represented in computers in terms of binary digits or bits; familiar base ten numbers can be represented in base two, and vice versa. A binary fraction is a fraction represented with binary digits, and a binary fraction space is a fraction space containing binary fractions. A binary task space is a task space containing a binary fraction space along at one dimension.

In task spaces, the density of points depends on their computer representation. Assigning more bits to hold each fraction (or at least some of the fractions) increases the density of the numbers that can be represented without moving the endpoints. That is, more numbers can be represented within the same interval if more bits per number are available.

Those of skill in the art will recognize that other fraction spaces, such as trinary fraction spaces on machines having tri-state switches and decimal fraction spaces on machines having binary-coded-decimal capability, may be readily adapted according to the teachings herein for use in associating tasks with processing units. That is, those of skill will recognize that trinary, decimal, and other fraction spaces are equivalent to binary fraction spaces for purposes of the present invention.

Processing Units

Processing units include servers, clients, stand-alone machines, the various computers discussed above in connection with FIG. 1, and combinations thereof Generally, any computer CPU or group of CPUs or computer controlled device(s) capable of executing a task can be used as a processing unit according to the present invention.

Intervals, Regions, and Dimensions

For clarity and convenience, FIGS. 3 through 6 illustrate the invention in one dimension using diagrams that map readily to the foundation space R of real numbers, but inventive embodiments may utilize multidimensional spaces and/or derived spaces. Thus, the discussion of intervals applies to regions unless indicated otherwise, and the discussion of fraction spaces pertains to other task spaces, unless indicated otherwise.

Figure 2:
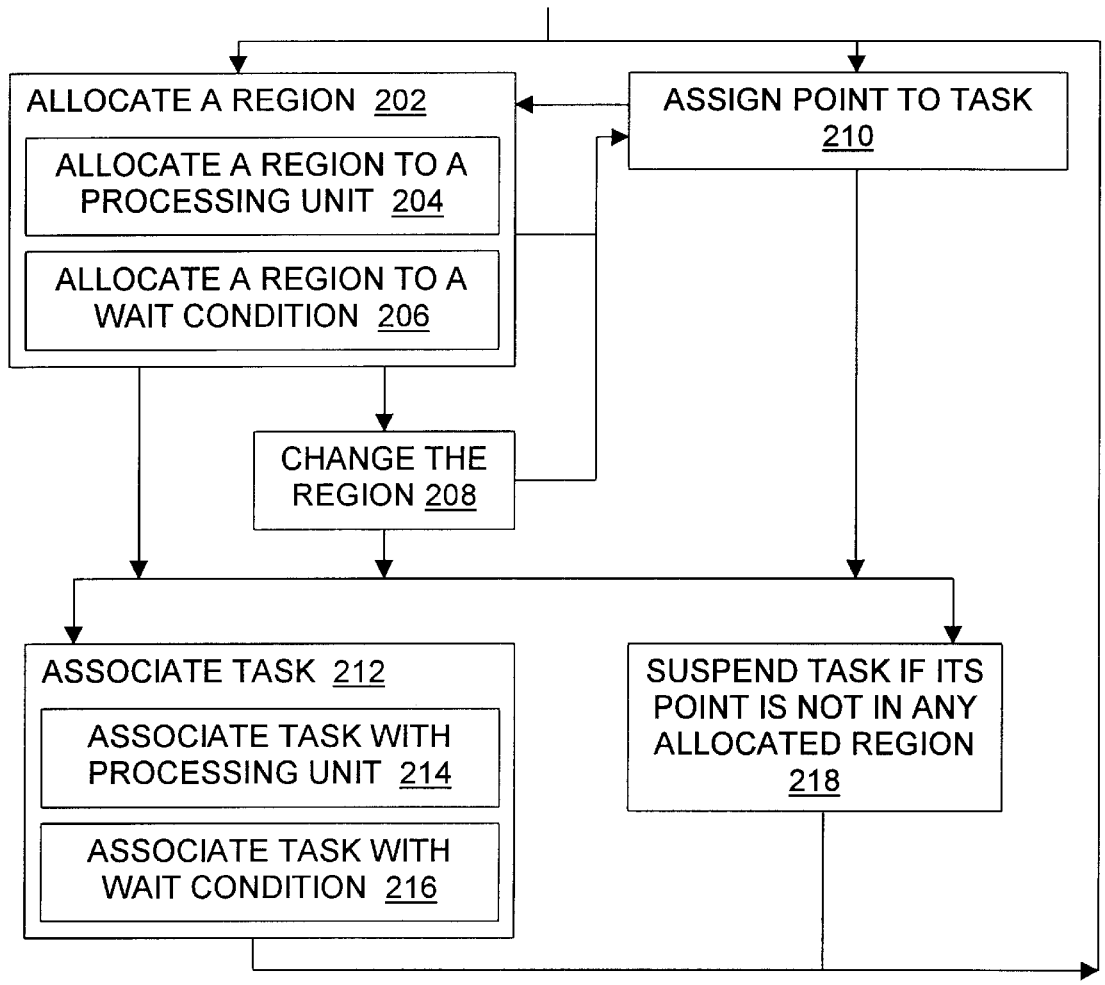
FIG. 2 is a is a flowchart illustrating task association methods of the present invention.

FIG. 2 likewise pertains to spaces of one or more dimensions. To allocate rectilinearly bounded regions in a multi-dimensional task space and assign points to tasks, one may generally repeat (or perform concurrently) the steps for one dimension a finite number of times for each of a finite number of dimensions in the task space, using default values for some dimensions if necessary. Suitable default values may be the entire extent of the dimension in question, or a distance and location previously specified in another dimension's interval or fraction, or an endpoint, for instance.

Relative Capacity and Task Distribution

Figure 3:
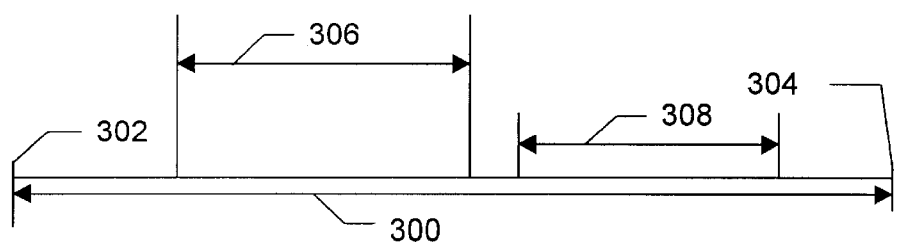
FIG. 3 is a diagram illustrating subsets in one dimension of a task space according to the present invention.

Assume that some measure of relative capacity is known for the various attributes of the processing units. FIG. 2 illustrates generally methods of the present invention for distributing tasks across processing units using points and task spaces. FIG. 3 illustrates one suitable task space 300 which includes endpoints 302 and 304. Two regions, 306 and 308, have been allocated within the task space 300.

During an allocating step 202, at least one region (or subregion such as an interval) is allocated. The allocation may be to a processing unit during a step 204, or it may be to a wait condition during a step 206. A given region may be defined to cover part or all of the task space 300. Wait conditions may be defined by identifying the resource being awaited. For example, tasks might await a particular kind of network message, or a particular database lock.

Region allocation may be performed by noting interval endpoints in a list or table which is maintained by a central allocation task, or in a distributed list or table which is maintained by the processing units. Region allocation may likewise be performed by noting the intervals for each dimension of a multidimensional task space. Appropriate signals are also discussed in connection with FIGS. 8 and 9.

Intervals and regions may be allocated on a first-come first-served basis, or they may be allocated by other methods described here to take advantage of special-purpose processing units or promote affinity, for instance. Processing units can be allocated regions based on factors such as the speed of individual processors, the relative power of a set of processors, and the availability of specialized hardware or software to more efficiently perform certain tasks such as image processing, signal processing, data mirroring, vector processing, and other types of tasks. Because task spaces are multi-faceted, more than one of these criteria may be used. For instance, a processing unit can be characterized in terms both of its excellent vector processing capability and its limited network bandwidth. This may be done by allocating to the processing unit a region which is defined in terms of a first point component (along an axis of a multidimensional space) or a first foundation space point (in a derived space) reflecting the large vector processing capability and a second point component or a second foundation space point reflecting the limited network bandwidth.

One approach to region allocation gives an equal portion of the task space to each processing unit. This may be appropriate when the system 100 consists of two or more equally-powerful processors. If the system 100 includes unequally powerful processing units, each server 106 or other processing unit can be allocated a task space region whose size is proportional to the power of the processing unit.

Of course, processing units may be equivalent in one way and quite different in another way. For example, suppose that two processors are equally powerful when it comes to processing automated teller transactions, but the latency for communications with one processor is much greater than the latency for communications with the other processor. Then a region allocation step could provide regions which have interval lengths that are equal in a dimension that represents transaction processing ability but unequal in a dimension that represents communications latency.

Relative processing power and other criteria are measured using one or more selected metrics. Each metric may be selected according to the needs of a specific computing system 100. For example, if speed is very important and processors have different processing speeds, the processing units that are faster tend to be given larger intervals in a speed dimension. If reliability is a limiting factor, processing units that are more reliable can be given larger intervals in a reliability dimension. Task assignment can then reflect different speed-reliability tradeoffs for different tasks. Other appropriate methods of determining relative processing unit power will be apparent to those of skill in the art using bandwidth, throughput, security, and other familiar criteria.

Some processing units may be differentiated by task type. For example, a subset of processing units may have acceleration hardware and/or software for vector processing. These processing units could be allocated adjacent regions so that processors of the same type are found in a single total region which is the union of the adjacent regions for the separate processing units. For instance, the vector processors in the system 100 would be given contiguous regions; a region containing the union of the adjacent regions could be advertised for tasks requesting vector processing acceleration. Those of skill in the art will recognize that other methods may also be used to allocate regions and their constituent intervals to processing units.

The extent and/or nature of an allocated region may be changed during a step 208. Possible changes include expanding the region, contracting the region, splitting the region, and/or moving the region, for instance. Unless the region defining the task space is changed, the new region must still be within the task space (e.g., between endpoints 302, 304). For example, when a new server appears, existing servers may have their respective allocated regions contracted. The new server is then assigned part or all of the newly-freed portion of the task space.

During an assigning step 210, a fraction or other point is assigned to a task. Recall that a point in a derived space may include one or more points of the underlying foundation space. Point assignment may be performed in various ways, as discussed below. Points may be assigned to tasks in a way that makes sense for a specific implementation. For instance, systems which are entirely or mostly homogeneous may assign a randomly chosen point in the task space to each task, while more elaborate systems may choose assignments that optimize inter-task communication, correlation between the nature of the task and special-purpose processing units, or other criteria. A task may be assigned a single point reflecting multiple criteria, such as its preference for lots of RAM and high reliability.

A task may be assigned multiple values (dimensional components and/or underlying foundation space points) to reflect acceptable alternatives which trade off different criteria. For instance, a task operating on confidential information might be assigned a point in a derived Hausdorff task space, with the derived space point including two points of a multidimensional foundation space. The first foundation space point characterizes the task as needing high security, a fast processor, and lots of memory (to reduce disk usage) on any processing unit attached to the Internet through a first type of firewall, while the second foundation space point characterizes the task as accepting lower security, a slower processor, and less memory on computers which are separated from the Internet by a different type of firewall.

Tasks may be associated with processing units randomly by choosing for each task a random point somewhere in the task space. This method may be of use when the inventive system possesses little or no recent information about the state of the processing units, or when all processing units are similar with respect to all relevant criteria. Relevant criteria may include bandwidth, processor speed, memory capacity, and/or other criteria identified herein and/or familiar to those of skill in the art.

When tasks are assigned randomly chosen points the possibility exists that some non-empty intersection will be assigned to two or more different tasks; the same holds true of randomly chosen points, although the likelihood decreases sharply as the number of dimensions grows. In some implementations, this will simply allow identical processor allocation for those tasks. In other implementations the task point is the only task name so it is better to ensure that the task point is unique for each task.

To promote uniqueness, some implementations represent a binary fraction space using a large number of bits to store the value of each individual binary fraction. For instance, a given implementation may use up to 1024 bits to represent the numbers within the binary fraction space. For many systems, the chance of a duplicate name in a task space of this size is much smaller than the chance of a catastrophic system failure due to other considerations. In multidimensional task spaces, the risk of duplicate points is smaller still.

A task may also be (at least initially) associated with a specific processing unit by randomly assigning to the task a point in the region allocated to that processing unit. As processing unit regions may be modified before the task is processed, the task could be processed by a different server without any change to the task's assigned point.

If the computing system includes accelerated or specialized processing units, and the specialized processing units have been given contiguous regions, the task might be given a point in the region served by the specialized servers. The more the task requires the specialized servers, the greater the probability should be that the point chosen will be near the center of the region served by the accelerated or specialized servers. Tasks which make less intensive use of the accelerated or specialized capability should choose points nearer the boundary of the region or outside it. This approach can be useful when load rebalancing across specialized processors is necessary due to processing unit failure, overload, or other causes.

Two more examples may be helpful. For instance, assume that some processors are specialized for vector processing and others are not, and tasks can be characterized in part according to the degree to which they need or would benefit from vector processing. One may then associate the subintervals of the vector processors with one end of an interval and the subintervals of the non-vector processing systems with the other end of the interval. Task points in a "vector processing" dimension may be assigned toward the appropriate end of the interval to encourage their association with the appropriate type of processing system.

As another example, assume there are several geographically dispersed servers with, for instance, one in New York, one in Chicago, one in Salt Lake City, and one in Los Angeles. Assume further that each geographic location has an associated subinterval and that the subintervals are arranged in a manner that tracks the actual network geography, with New York at one end and Los Angeles at the other end. A task which originates in St. Louis, for example, should be assigned a fraction in a "geography" dimension corresponding to its geographic location, thereby making it more likely the task would be handled by the Chicago or Salt Lake City servers.

During an associating step 212, the task is associated with a processing unit or a wait condition. If the region allocated to a processing unit contains a point assigned to the task, then the task and the processing unit are associated during a step 214. If the region allocated to a wait condition contains the only point assigned to the task, then the task and the wait condition are associated during a step 216. If the point(s) assigned to a task is/are not contained in any allocated region, then the task is suspended during a step 218.

The steps shown may be performed in various orders and/or concurrently unless one step requires the results of another step, in which case the step(s) which produce the result must necessarily at least partially precede those which use the result. For instance, steps 202 and 210 may be performed by allocating a region first, by assigning points first, or by allocating and assigning in an overlapping and/or interleaved manner. By contrast, the associating step 212 requires at least one allocated region and at least one assigned point before it can perform association so it necessarily follows steps 202 and 210, at least in part. Steps may also be repeated (as when fractions are assigned or regions are allocated, in different dimension), or omitted, unless this is expressly prohibited by the claims.

EXAMPLE

With reference to the discussion below of region configurations, server A is assigned the half-open interval [0, 0.5) in a first dimension, expressed as binary fractions [0.0000000 to 0.0111111), and server B is assigned the half-open interval [0.5,1) in the same dimension, expressed as binary fractions [0.1000000 to 0.1111111). A task which is assigned a point having as its first dimension component the binary fraction equivalent of 0.75 (0.1100000) is associated with server B, as are all other tasks whose first dimension binary fractions lay in server B's interval.

If server B fails, it is not necessary to find all tasks in B's interval and give them a new fraction in A's interval in an operation analogous to traditional methods. Instead, server A announces that its new interval is [0,1), that is, [0.0000000 to 0.1111111). Therefore, with a single change in A's region, all tasks will be appropriately assigned to server A. Reassignment may be preemptive, or it may be performed after a task yields control, is restarted, or at other milestones. Associating tasks with new servers by modifying server allocated regions in this manner can be faster and computationally simpler than some existing methods. It may be done to reassign tasks in case of a failure, during load rebalancing, or in other situations in which tasks must be reassigned to processing units.

Performance Profiles and Task Distribution

An interesting situation exists when the regions in the task space assigned to processing units do not reflect capacities, but instead reflect the performance profile of the processing unit(s). For example, suppose that some processing units are self-configurable. For instance, it could be that some processors operate at different speed ranges depending on the number of active address lines on the data bus. Suppose further that some tasks prefer a flexible execution environment, in the sense that at certain times or under certain (data dependent) conditions the tasks favor speed over accessible memory or vice versa. The invention allows the task to be assigned a set of values (point components and/or foundation space points) in the task space that reflects or "footprints" the nominal environment sought for executing the task. Such a task footprint can be used to associate the task with the processing unit(s) having the "closest" performance profile.

In general, consider a Hilbert space H in which each axis corresponds to a processing unit resource or capability such as processor speed, disk latency, latency across the address bus, and so on. Each processing unit Pi in the network corresponds to a region pi in H which represents Pi's performance profile in the task space. The task Tk enters the system and is assigned the point (compact set of one or more N-dimensional vectors) tk which specifies a nominal execution environment for the task in the space H.

If we stipulate that both processors and tasks can have only finitely many attributes (a practical requirement), then there is some minimal, finite dimensional subspace SUBi of H that spans Pi's allocated region pi, and some minimal, finite dimensional subspace SUBk of H that spans Tk's assigned point tk. We restrict attention to a subsequence Pij of the sequence of processors each of whose corresponding regions pi includes the point tk. That is, we are only interested in processors capable of meeting the requirements of the task.

Project each pij onto tk and sort lowest to highest by projection distance. Compute the Hausdorff distance between tk and the projections of pij to find the first projection that is within some specified threshold distance of tk. Make a request to reserve the corresponding processing unit Pij for the task Tk. If the processing unit Pij refuses the request, continue the (sorted) compare, make another request, and so on. If a processing unit Pij agrees to service the request, modify pij to reflect the impact of Tk's request and send Tk to the processing unit Pij.

Of course, the processing unit must give notification when the task ends (along with completion status), so that pij can reflect resource recovery, and appropriate disposition of Tk can be made. Note that by sorting Pij and accepting a threshold ("good enough") match we avoid unnecessary resource bottlenecks.

Given the basic mechanisms of method 2, one can contemplate useful variations, such as decomposing a task into serially dependent sets of independent subtasks, with the intent to distribute any given set of subtasks across an appropriate collection of processing units. This would be especially useful in the situation where no one processing unit has a profile which spans the footprint of a task. Other useful variations of these methods may also be apparent to those of skill in the art in a particular situation.

Region Configurations

In some implementations, one or more dimensions of a task space will be a fraction space defined by the values zero and one. Four binary fraction spaces defined by the values zero and one are: the numbers between 0.0 and 1.0, excluding the endpoints 0.0 and 1.0, written in standard notation as the open interval (0.0, 1.0); the numbers between 0.0 and 1.0 including the endpoint 0.0 but excluding endpoint 1.0, written in standard notation as the half open interval [0.0, 1.0); the similar half open interval (0.0, 1.0]; and the closed interval [0.0, 1.0] which includes both endpoints. Those of skill in the art will recognize that endpoints other than 0.0 and 1.0 can also be used according to the invention.

Half-open intervals may be used to create non-overlapping adjacent intervals. For example, the half-open interval (0, 0.5] and the half-open interval (0.5, 1] do not overlap as the first interval includes the endpoint 0.5, while the second interval does not.

In some cases, allocated processing unit regions in a given task space do not cover the entire corresponding task space. One of many such cases is shown in FIG. 3. The line 300 represents a task space or task space dimension which has endpoints 302 and 304. One processing unit is assigned the region 306, while another processing unit is assigned the region 308. If a task is assigned a point that is not contained in any processing unit region, such as between endpoint 304 and region 308 or between the two regions 306 and 308, then execution of that task may be suspended during step 218.

Figure 4:
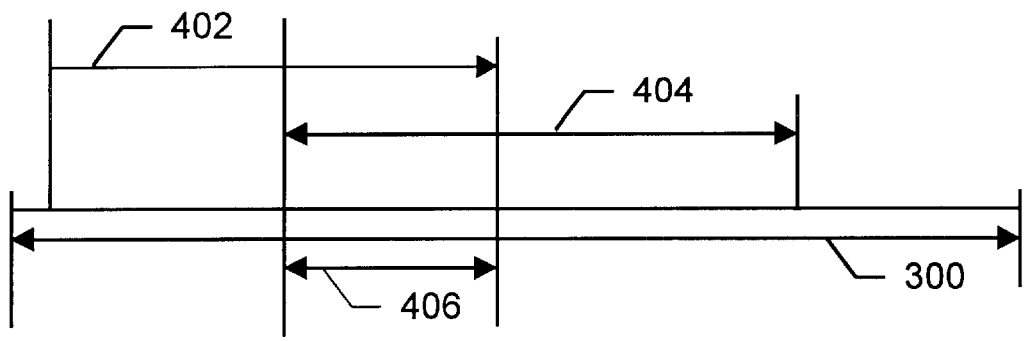
FIG. 4 is a diagram further illustrating subsets in a task space according to the present invention.

With reference to the example shown in FIG. 4, in some cases the allocation of regions to processing units permits overlapping regions to be allocated to different processing units in one or more given dimensions. Within the task space 300 a region 402 is allocated to a first processing unit P1. A region 404 is allocated to a second processing unit P2. The region 406 is shared by the two regions 402 and 404. If a task is assigned a point containing in the dimension in question a point within the region 406, then during step 214 the task can be designated for scheduling to run on either P1 or P2.

More than two processing units may also share a set of points, in one or more dimensions of a task space. In some embodiments two or more processing units may have regions which are coextensive, or the region allocated to one processing unit may be a proper subset of the region allocated to another processing unit.

Various approaches may be used to determine which processing unit is associated with a task whose assigned point includes a point that lies in a shared region. For example, a processing unit could be chosen randomly, processing units could be given percentages of the tasks that fall within their shared region, dimensions could be ranked so that non-overlapping regions take precedence, and so on. Those of skill in the art will understand that many different methods could be used.

Figure 5:
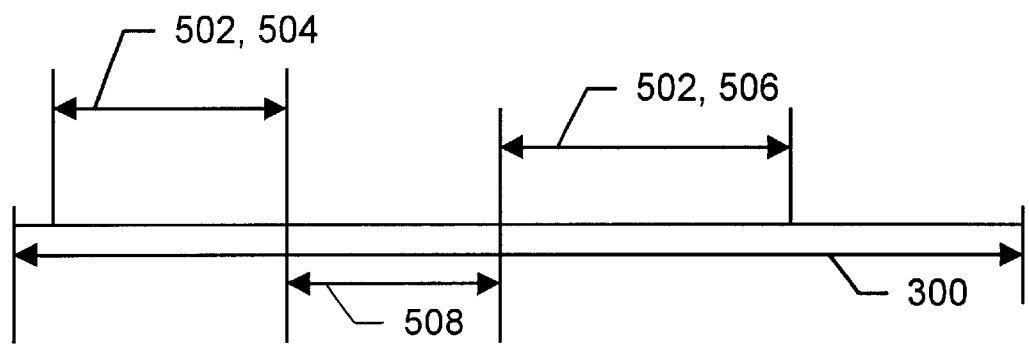
FIG. 5 is a diagram further illustrating subsets in a task space according to the present invention.
Figure 6:
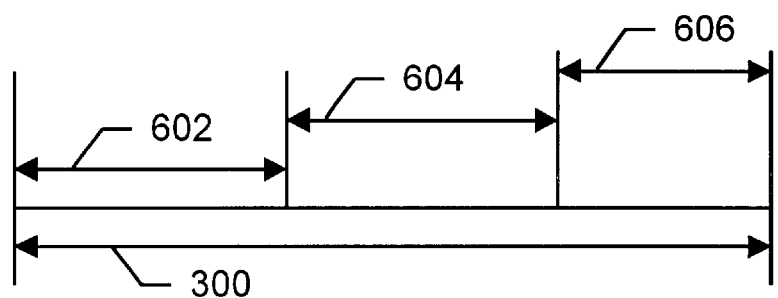
FIG. 6 is a diagram further illustrating subsets in a task space according to the present invention.

FIG. 5 illustrates a configuration in which a region 502 for a single processing unit includes at least two disjoint sub-intervals; in this example, region 502 includes the intervals 504 and 506 but does not include the intervening interval 508. Intervals 504 and 506 are both assigned to the same processor P1 in the dimension in question. A task will be associated with P1 if its fraction for the dimension in question falls either within the interval 504 or within the interval 506, that is, if its fraction falls within region 502. Those of skill in the arts will recognize that in any one or more dimensions of a task space there could be more than two subregions for a single processing unit, the subregions could overlap other processing unit regions, they could be contiguous to other processing unit subregions, or they could be separated by areas not assigned to any processing unit. Regions assigned to processing units and to wait conditions may also coexist in some configurations.

As noted, one or more wait conditions may also be assigned regions in the task space. When a task is assigned a point within the region that is allocated to a wait condition, the task awaits further processing pending satisfaction of the wait condition. For example, all tasks awaiting a certain kind of network message (type X, for our example) may be given a point within a "network wait for message type X" region. Upon arrival of a message of type X, the processing unit in possession of message type X could extend its region to include a region in which the points assigned to waiting tasks are contained, thereby associating the waiting tasks with the processing unit that can provide the resource(s) for which the tasks were waiting. Multiple dimensions in the task space may correspond to multiple resource types and/or multiple individual resources.

As noted, there are several options for placement of regions within the task space. In some implementations the union of the allocated regions in one or more (and possibly all) dimensions does not cover the task space, leaving open the possibility that a point will not be within the region of any processor. In such cases, a task having a point not within any region may be suspended during step 218 until changes in one or more regions place the point within an allocated region. In other implementations, the configuration in one or more (and possibly all) dimensions will be similar to that shown in FIG. 6, in that the union of the allocated regions covers the task space. Regions 602, 604, and 606 completely cover the space 300, guaranteeing that a task assigned a point within the task space will be associated with a processing unit; corresponding regions could cover the entire task space, guaranteeing that a task assigned a point within the task space will be associated with a processing unit.

More on Systems

Figure 7:
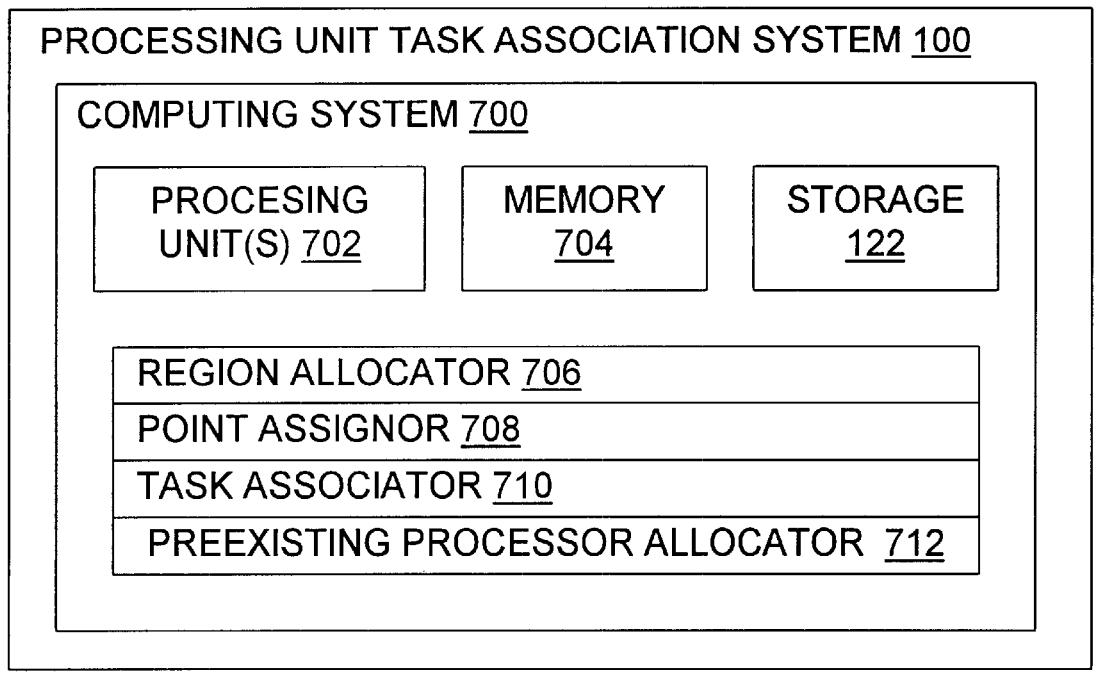
FIG. 7 is a diagram further illustrating the system shown in FIG. 1.

The methods, structures, and signals discussed herein can be used or embodied in a variety of systems, including the particular system 100 which is shown in FIG. 1 and further illustrated in FIG. 7. The system 100 includes at least one computing system 700 which may include one or more of the various computers identified above in connection with FIG. 1, for instance. The computer 700 includes at least one processing unit 702 and memory 704. The memory 704 may include volatile memory such as standard RAM and/or non-volatile memory such as battery-backed RAM, disks, tape, or disk arrays 120.

The system 100 also includes a region allocator 706, which allocates regions of a task space to the processing units 702 and/or wait conditions according to the teachings herein. In some embodiments, each region is connected in the sense that it cannot be represented as the union of two disjoint non-empty sets. In other embodiments regions are not necessarily connected, so "intervals" of the region in one or more dimensions may actually be the union of two or more simpler (connected) intervals and/or individual points. Region allocation may be performed using the methods and criteria described herein, and may be reflected in allocation signals described herein.

A point assignor 708 assigns each of one or more tasks a point in the task space. The task space may be a binary fraction space and the assigned point a binary fraction. The task space may be a derived (Hausdorff) space and the assigned point may be a set of several binary fractions or several other foundation space points. The task space may be a multidimensional space and the assigned point may accordingly have several components (one per dimension). A variety of points and task spaces may be used according to the teachings herein. The assigned point may be recorded in a task control block or similar data structure.

A task associator 710 associates a given task with a given processing unit if the region allocated to the processing unit contains the point assigned to the task. The task associator 710 associates a given task with a wait condition if the region allocated to the wait condition contains the point assigned to the task. If no allocated region contains the assigned point, then the task associator 710 suspends the task.

The region allocator 706, point assignor 708, and task associator 710 are shown in FIG. 7 as separate modules, but those of skill in the programming arts will recognize that the functionality of the three modules could be incorporated into a single module, or two of the three could be incorporated in one module.

Suitable software and/or hardware implementations of these components 706 through 710 according to the invention are readily provided by those of skill in the art using the teachings presented here and programming languages and tools such as Java, Pascal, C++, C, Perl, shell scripts, assembly, firmware, microcode, logic arrays, PALs, ASICs, PROMS, and/or other languages, circuits, or tools.

Some embodiments contain a preexisting processor allocator 712 which uses conventional tools and techniques to associate tasks with processors. The present invention is compatible with many such conventional approaches. Conventional tools and techniques for processor allocation can be integrated into a novel system according to the teachings herein by having the region allocator 706 allocate one or more regions to the preexisting processor allocator 712. When the point assignor 708 assigns a point to a task within the region for the preexisting processor allocator 712, the job of associating the task with a processing unit is handed off in part to the preexisting processor allocator 712 to be performed using conventional mechanisms.

Signals

Figure 8:
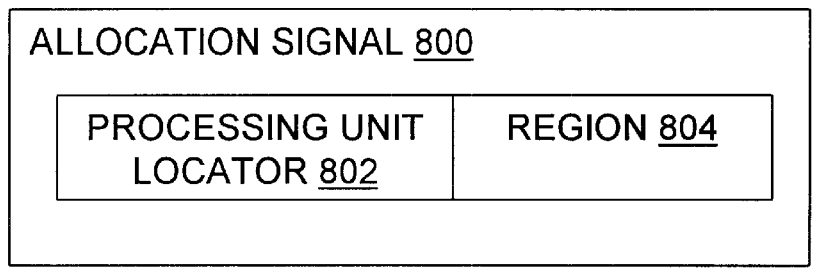
FIG. 8 is a diagram illustrating an allocation signal embodied according to the present invention.

Signals according to the invention may be embodied in storage media 122, signal lines 108, disks 120, and/or memory 704. FIG. 8 shows one embodiment of an allocation signal 800 which includes a processing unit locator 802 and a region 804. The processing unit locator 802 may be a global or local network address, uniform resource locator, distinguished name, GUID, tuned name, index or pointer into a list of sockets or connections, dial-in number, or another means of locating a processing unit. The region 804 specifies intervals which define the points belonging to the region 804. The correspondence between the processing unit locator 802 and the region 804 may be created during the associating step 212 by placing the fields 802 and 804 in corresponding table locations, by making at least one of the fields point to the other, by storing them in adjacent memory locations, or by other means.

Figure 9:
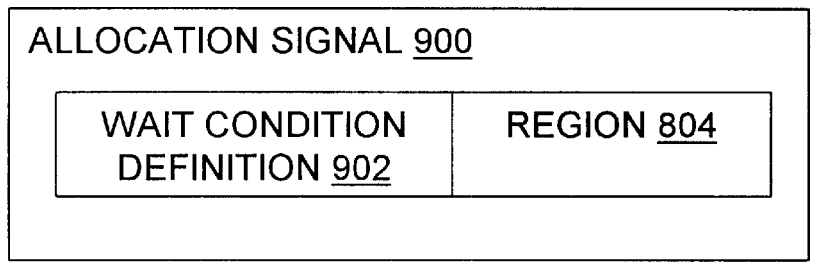
FIG. 9 is a diagram illustrating another allocation signal embodied according to the present invention.

FIG. 9 shows another embodiment of an allocation signal 900, which includes a wait condition 902 and a region 804. The wait condition 902 may include resource identifiers, such as database lock identifiers, flags, semaphores, network message templates, or other resource identifiers. The correspondence between the wait condition 902 and the region 804 may be created during the associating step 212 in a manner similar to that described above in connection with the signal 800. In a given case, an allocation signal may include zero or more correspondences of the type shown in FIG. 8 and/or zero or more correspondences of the type shown in FIG. 9, provided at least one correspondence is present.

Additional Examples

One system 100 performs rebalancing as follows when a processor goes off-line. Processing units which are still operating have intervals of their regions in a particular dimension concentrated in the middle of a total interval which is allocated for special use, while non-specialized processing units are given intervals near an end of the total special use interval. Allocation of the new intervals depends both on the system and the specific facts of a particular incident. But in general those tasks which depend less on the specialized capability corresponding to the dimension in question will tend to find their assigned point in the interval of a less-specialized or non-specialized server, and hence find their assigned point in the region of a less-specialized or non-specialized server.

Tasks which communicate or share information with one another, known herein as "cooperative tasks", may also be given points that are close to each other in the metric(s) used. This tends to increase the likelihood that the tasks will be processed by the same processing unit or by units having similar characteristics, as close points are likely to be in the same region when regions are connected, and tend therefore to be served by the same or similar processing unit(s). This in turn reduces the cost of communications and/or sharing that is required by the tasks.

Another modification used in some embodiments reflects the degree of communication and/or sharing among tasks by assigning points whose closeness is directly related to the closeness of the tasks. That is, tasks which have more communication and/or sharing will tend to have numerically closer assigned points than tasks which have less communication and/or sharing. Those of skill in the art will be able to define "closeness" appropriately for a particular system.

Summary

In summary, the present invention provides novel systems, signals, devices, and methods for associating tasks with processing units and/or wait conditions. Processing units and/or wait conditions are given regions in a multi-faceted (multidimensional and/or derived) task space. Component spaces in a multidimensional task space may correspond to "real" sections of the number line, so a given task space dimension may contain an arbitrarily large set of fractions, subject to the availability of storage space used to represent fractions and intervals. The boundaries of a task space can remain fixed even if more processing units are added, if processing units are subtracted, or if the criteria for associating tasks with processing units change.

Each task is assigned one or more points within the task space. Each processing unit and/or wait condition is allocated a region. The task is associated with the processing unit or wait condition whose region is closest to the assigned point(s). When the mapping between tasks and processing units or wait conditions must be modified due to processing unit failure, load balancing, or some other cause, the regions allocated to the processing units and wait conditions are modified. The points which identify the tasks need not be changed.

Although particular methods (FIG. 2) and signal formats (FIGS. 8 and 9) embodying the present invention are expressly illustrated and described herein, it will be appreciated that apparatus and article embodiments may be formed according to the signals and methods of the present invention. Unless otherwise expressly indicted, the description herein of methods and signals of the present invention therefore extends to corresponding apparatus and articles, and the description of apparatus (FIGS. 1 and 7) and articles (FIGS. 1,2,7–9) of the present invention extends likewise to corresponding methods and signals.

As used herein, terms such as "a" and "the" and item designations such as "processing unit" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Any explanations provided herein of the scientific or mathematical principles employed in the present invention are illustrative only. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A processing unit task association system for associating tasks with processors, the system comprising:
    a computing system having at least one processing unit;
    a region allocator which allocates a multidimensional region to the processing unit, the multidimensional region being within a multidimensional task space;
    a point assignor which assigns a multidimensional point to a task; and
    a task associator which associates the task with the processing unit if the multidimensional region allocated to the processing unit is close to the multidimensional point assigned to the task, wherein the task associator uses Euclidean distance to determine whether the multidimensional region allocated to the processing unit is close to the multidimensional point assigned to the task.

2. The system of claim 1, wherein the computing system has at least two processing units, each multidimensional region includes an interval in a given dimension, and the region allocator allocates equally sized intervals in the given dimension to each processing unit.

3. The system of claim 1, wherein the computing system has at least two processing units, the processing units are unequally powerful according to a selected metric, each multidimensional region includes an interval in a given dimension corresponding to the selected metric, and the region allocator allocates intervals in the given dimension for each processing unit proportional to the power of each processing unit according to the selected metric.

4. The system of claim 1, wherein the computing system has at least two differentiated processing units which are tailored to process specific types of tasks, and the region allocator allocates adjacent regions to those differentiated processing units.

5. The system of claim 1, further comprising a preexisting processor allocator and wherein the region allocator allocates an Interval to the preexisting processor allocator.

6. The system of claim 1, wherein tasks further comprise cooperative tasks and the point assignor assigns nearby points to cooperative tasks.

7. A processing unit task association system for associating tasks with processors, the system comprising:
    a computing system having at least one processing unit;
    a region allocator which allocates a multidimensional region to the processing unit, the multidimensional region being within a multidimensional task space;
    a point assignor which assigns a multidimensional point to a task; and
    a task associator which associates the task with the processing unit if the multidimensional region allocated to the processing unit is close to the multidimensional point assigned to the task, wherein the task associator uses taxicab distance to determine whether the multidimensional region allocated to the processing unit is close to the multidimensional point assigned to the task.

8. A processing unit task association system for associating tasks with processors, the system comprising:
    a computing system having at least one processing unit;
    a region allocator which allocates a region to the processing unit, the region being within a multi-faceted task space that is a derived space based on a foundation space, such that the region is a subset containing multiple points of the foundation space and the derived space uses a Hausdorff metric;

a point assignor which assigns a point to a task, such that the point is derived space point as a subset containing at least one point of the foundation space; and a task associator which associates the task with the processing unit if the region allocated to the processing unit is close to the point assigned to the task.

* * * * *